United States Patent
Gopalakrishnan

(10) Patent No.: US 6,646,781 B2
(45) Date of Patent: Nov. 11, 2003

(54) LOSS PREVENTION STRUCTURES FOR OPTICAL MODULATION APPLICATIONS

(75) Inventor: Ganesh K. Gopalakrishnan, Bethesda, MD (US)

(73) Assignee: Codeon Corporation, Columbia, MD (US)

( * ) Notice: Subject to any disclaimer, the term of this patent is extended or adjusted under 35 U.S.C. 154(b) by 0 days.

(21) Appl. No.: 09/781,308

(22) Filed: Feb. 13, 2001

(65) Prior Publication Data

US 2002/0109895 A1 Aug. 15, 2002

(51) Int. Cl.[7] .............................. G02F 1/00; G02F 1/035
(52) U.S. Cl. .............................. 359/321; 385/2; 385/8; 385/39; 385/131
(58) Field of Search .............................. 385/1, 2, 3, 4, 385/8, 9, 14, 15, 16, 24, 27, 31, 39, 40, 41, 130, 131, 132; 359/245, 322, 321, 244

(56) References Cited

U.S. PATENT DOCUMENTS

| | | | |
|---|---|---|---|
| 5,074,631 A | | 12/1991 | Hamano et al. ................. 385/3 |
| 5,303,079 A | | 4/1994 | Gnauck et al. .............. 359/188 |
| 5,404,412 A | * | 4/1995 | Seino et al. ..................... 385/2 |
| 5,408,544 A | | 4/1995 | Seino ............................... 385/3 |
| 5,502,780 A | * | 3/1996 | Rangaraj ........................ 385/3 |
| 5,787,211 A | | 7/1998 | Gopalakrishnan .............. 385/2 |
| 5,949,944 A | * | 9/1999 | Minford et al. ............. 385/131 |
| 6,400,490 B1 | * | 6/2002 | Hosoi ........................ 359/254 |

OTHER PUBLICATIONS

A. H. Gnauck et al., "Dispersion Penalty Reduction Using an Optical Modulator with Adjustable Chirp," IEEE Photonics Technology Letters, vol. 3, No. 10, Oct. 1991, pp. 916–918.

G. K. Gopalakrishnan et al., "Performance and Modeling of Broadband LiNbO$_3$ Traveling Wave Optical Intensity Modulators," Jour. Of Lightwave Technology, vol. 12, No. 10, Oct. 1994, pp. 1807–1819.

G. K. Gopalakrishnan et al., "Performance and Modeling of Resonantly Enhanced LiNbO$_3$ Modulators for Low–Loss Analog Fiber–Optic Links," IEEE Trans. On Microwave Theory and Techniques, vol. 42, No. 12, Dec. 1994, pp. 2650–2656.

P. Jiang et al. "LiNbO$_3$ Mach–Zehnder Modulators with Fixed Negative Chirp," IEEE Photonics Technology Letters, vol. 8, No. 10, Oct. 1996, pp. 1319–1321.

G. H. Smith et al., "Overcoming Chromatic–Dispersion Effects in Fiber–Wireless Systems Incorporating External Modulators," IEEE Trans. On Microwave Theory and Techniques, vol. 45, No. 8, Aug. 1997, pp. 1410–1415.

* cited by examiner

*Primary Examiner*—Hung Xuan Dang
*Assistant Examiner*—Tuyen Tra
(74) *Attorney, Agent, or Firm*—Morgan Lewis & Bockius LLP

(57) ABSTRACT

An optical device includes a grounded base and an optical modulator chip having a top surface, a back surface and side surfaces. The optical modulator chip includes a first ground electrode, a signal electrode and a second ground electrode located over the top surface of the optical modulator chip. A resistive paint is on the back surface of the optical modulator chip to reduce losses due to extraneous modes or bias instabilities.

19 Claims, 5 Drawing Sheets

LOSS PREVENTION STRUCTURES FOR OPTICAL MODULATION APPLICATIONS

BACKGROUND OF THE INVENTION

1. Field of the Invention

The present invention relates to an optical modulation system, and more particularly, to the interconnection of external electrodes to an optical modulator so as to minimize loss of signal energy and to prevent the introduction of spurious modes into the signal within the optical modulator.

2. Discussion of the Related Art

In a general fiber optical communication system, optical signals are sent along an optical fiber communication line to a desired location. Optical modulators with performance in the 40 GHz frequency range and beyond, are critical components in optical communication systems.

To achieve high-frequency operation in $LiNbO_3$, the electrical and optical velocity of the modulating and modulated signal must be matched. This is achieved by employing thick (>10 $\mu$m) electrodes in conjunction with a buffer layer (typically $SiO_2$). The buffer layer is deposited directly on the $LiNbO_3$, and the electrode structure is delineated on the buffer layer. While the buffer layer facilitates velocity matching, it also results in decreased modulation efficiency because the applied voltage is partially dropped across the buffer layer. $LiNbO_3$ is an anisotropic material, with the following dielectric constants:

$$\epsilon_{extra-ordinary} \approx 26, \epsilon_{ordinary} \approx 43$$

Thus, planar and uni-planar transmission lines such as microstrip, coplanar waveguide (CPW) and coplanar strip (CPS) tend to be very dispersive when built directly on $LiNbO_3$. As the frequency increases, the fields become more concentrated in the regions below the metal strips, where the substrate permittivity has already resulted in a relatively larger electric displacement since the fields are forced into the $LiNbO_3$ to an increasing extent as the frequency increases. Therefore, a frequency dependent effective permittivity can be defined for the transmission line.

FIG. 1 illustrates a conventional optical modulator device. The modulator has a mounting base 1 that is typically conductive or a non-conductive material covered with a conductive layer. The mounting base 1 is typically at the ground potential of the device and will herein be referred to as the grounded base 1. The optical modulator has an optical modulator chip 2, for example a $LiNbO_3$ chip covered with an insulating buffer layer, mounted on the grounded base 1. The grounded base 1 includes input/output optical terminals 6 and input/output electrical terminals 7. The optical modulator chip 2 has two ground electrodes 3/3' and a signal electrode 4 mounted on top of the buffer layer above the waveguide 5 that runs across the center of the optical modulator chip 2. This electrode configuration is known as a coplanar-waveguide (CPW). When the electrode structure of the optical modulator chip 2 comprises just one signal electrode, and one ground plane, it is known as a coplanar-strips (CPS) configuration.

Once the electric fields of the signal electrode penetrate through the buffer layer into the optical modulator chip several other effects could occur. Depending on frequency, a CPW mode may couple with other extraneous electrical modes that the structure of the optical modulator device can support. These modes could either be highly dispersive slab modes, or could be zero-cut-off modes. Examples of extraneous modes are: transverse-electric (TE) or transverse magnetic slab modes, parallel-plate modes, that could be excited between the electrodes on the top surface and the grounded base, and a microstrip mode between the top electrodes and the grounded base. When coupling to extraneous modes occurs, there is a loss of power for the dominant CPW mode. Such a power loss degrades the optical modulator device's modulation performance and the clarity of the output modulated optical signal is degraded. The amount of power lost to spurious or other extraneous modes depends on the field overlap between the dominant CPW mode and the other extraneous modes supported by the device.

The intended electrical guided mode for an optical modulator contains the frequency of an input or frequencies of input on the optical modulator for operating the optical modulator device. Typically, an optical modulator has a range of sets of frequencies that can be used as electrical inputs to modulate an optical signal. For proper operation of the optical modulator device, the intended electrical guided mode of the device must be such that the electric fields originating on the signal electrode must properly terminate on the adjacent ground electrodes without straying elsewhere in the modulator chip or package. The intended electrical guided mode of the optical modulator device will hereinafter be referred to as the dominant CPW mode of the optical modulator device.

Once the electric fields of the signal electrode penetrate through the buffer layer into the optical modulator chip, several other effects could occur. Depending on frequency, a CPW mode may couple with other extraneous electrical modes that the structure of the optical modulator device can support. These modes could either be highly dispersive slab modes, or could be zero-cut-off modes. Examples of extraneous modes are: transverse-electric (TE) or transverse magnetic slab modes, parallel-plate modes (that could be excited between the electrodes on the top surface and the grounded base), and microstrip mode (between the top electrodes and the grounded base). When coupling to extraneous modes occurs, there is a loss of power for the dominant CPW mode. Such a power loss degrades the optical modulator device's modulation performance and the clarity of the output modulated optical signal is degraded. The amount of power lost to spurious or other extraneous modes depends on the field overlap between the dominant CPW mode and the other extraneous modes supported by the device.

Maintaining bias stability between the ground and the signal by preventing a charge build-up on the optical modulator chip is important for satisfactory operation of the optical modulator device. Otherwise, the optical modulation will not accurately represent the electrical signal that was inputted into the optical modulator as a result of bias instability caused by charge build-up on the optical modulator chip.

SUMMARY OF THE INVENTION

Accordingly, the present invention is directed to an optical modulator that substantially obviates one or more of the problems due to limitations and disadvantages of the related art.

The present invention provides an optical modulator with a structure to enhance bias stability so as to minimize signal loss.

The present invention provides an optical modulator with a structure and to prevent the introduction of extraneous modes into the modulated optical signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an optical device of the present invention includes an optical modulator chip having a top surface, a back surface and side surfaces; at least one ground electrode and a signal electrode located over the top surface of the optical modulator chip; and a resistive layer applied on the back surface of the optical modulator chip.

In another aspect, the optical device of the present invention includes a grounded base having a top surface; an optical modulator chip having a top surface, a back surface and side surfaces, wherein the optical modulator chip positioned over the grounded base with the back surface of the optical modulator chip facing the top surface of the grounded base; and wherein a resistive layer is positioned between the grounded base and the optical modulator chip.

In another aspect, the optical device of the present invention includes a grounded base having a top surface; an optical modulator chip having a top surface, a back surface and side surfaces, wherein the optical modulator chip is positioned over the grounded base with the back surface of the optical modulator chip facing the top surface of the grounded base; at least one ground electrode and a signal electrode located over the top surface of the optical modulator chip; and a resistive layer positioned between the top surface of the grounded base and the back surface of the optical modulator chip.

BRIEF DESCRIPTION OF THE DRAWINGS

The accompanying drawings, which are included to provide a further understanding of the invention and are incorporated in and constitute a part of this specification, illustrate exemplary embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. The present invention is particularly useful in optical modulators and switches for optical telecommunications network systems that carry optical communications signals, such as wavelength division multiplexed (WDM) signals, over optical fibers.

Figure 1:
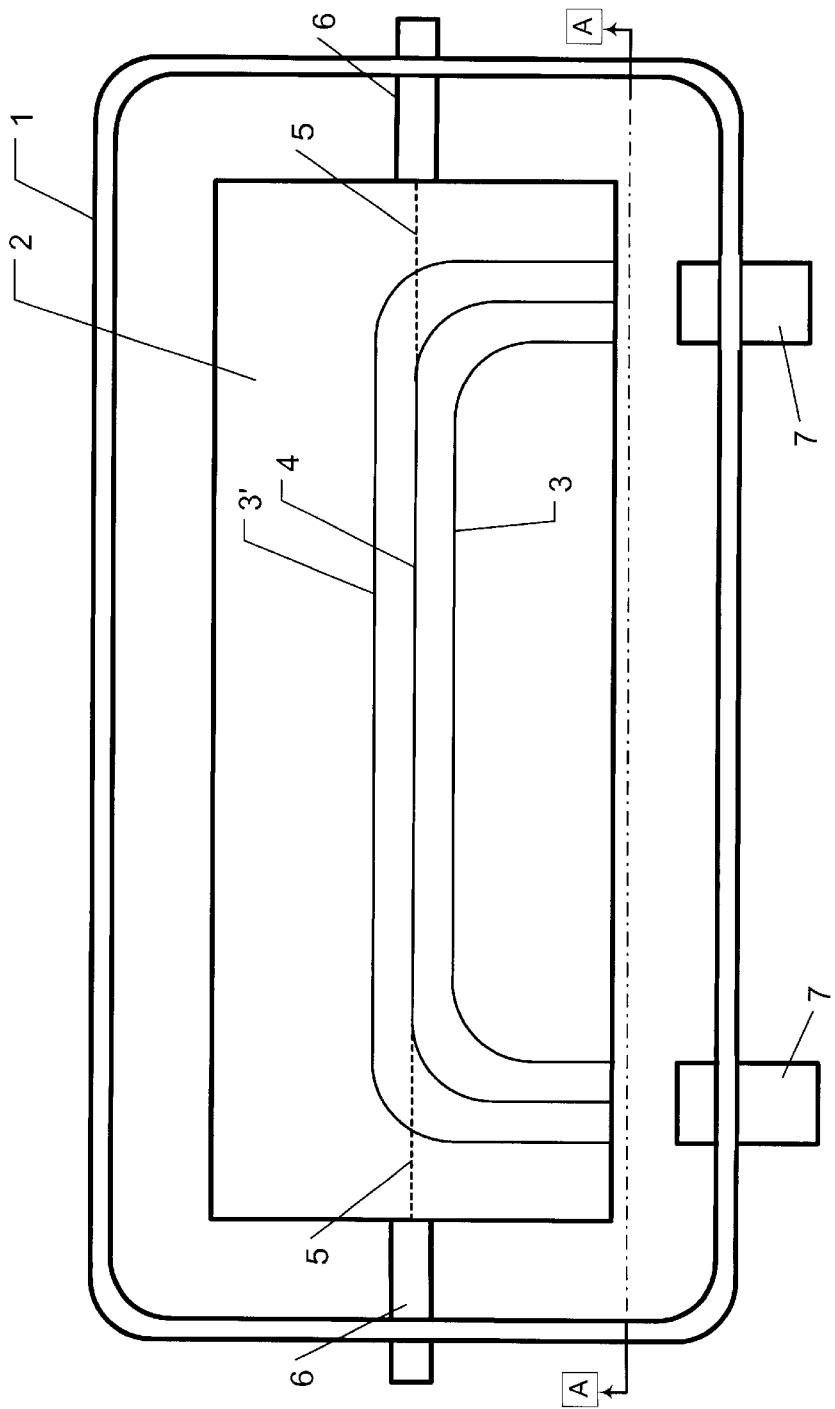
FIG. 1 shows a top view of a conventional optical modulation device.
Figure 2:
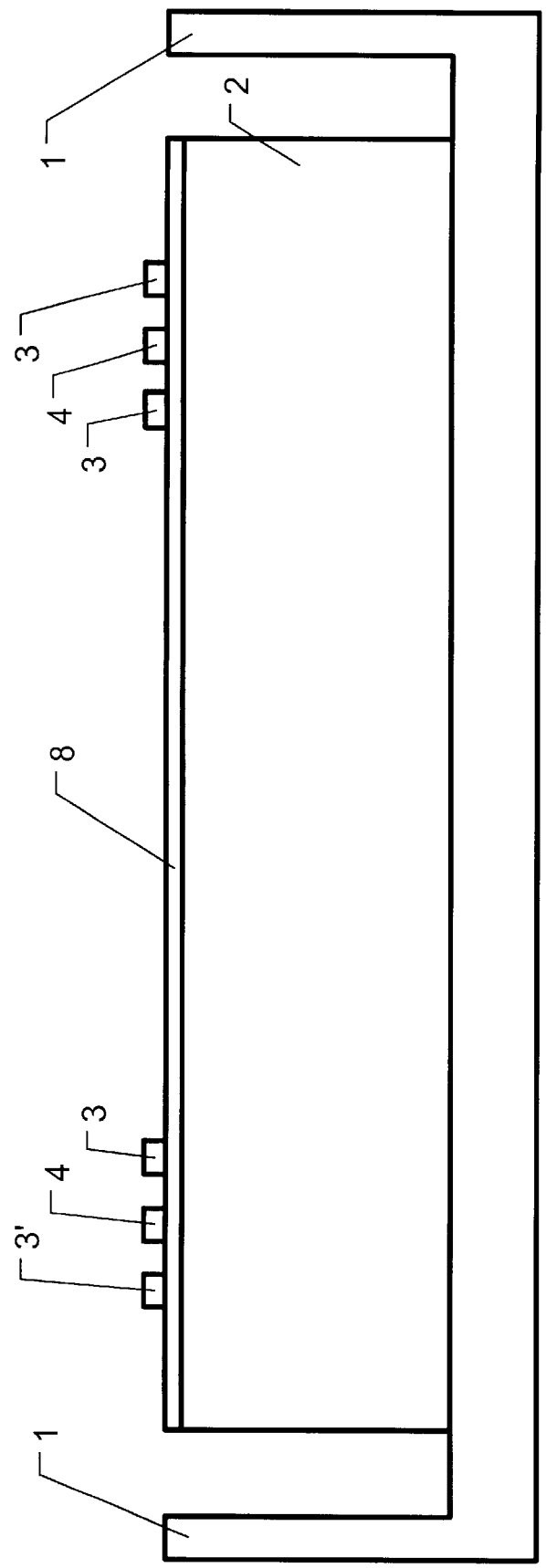
FIG. 2 shows a side view of a conventional optical modulation device.
Figure 3:
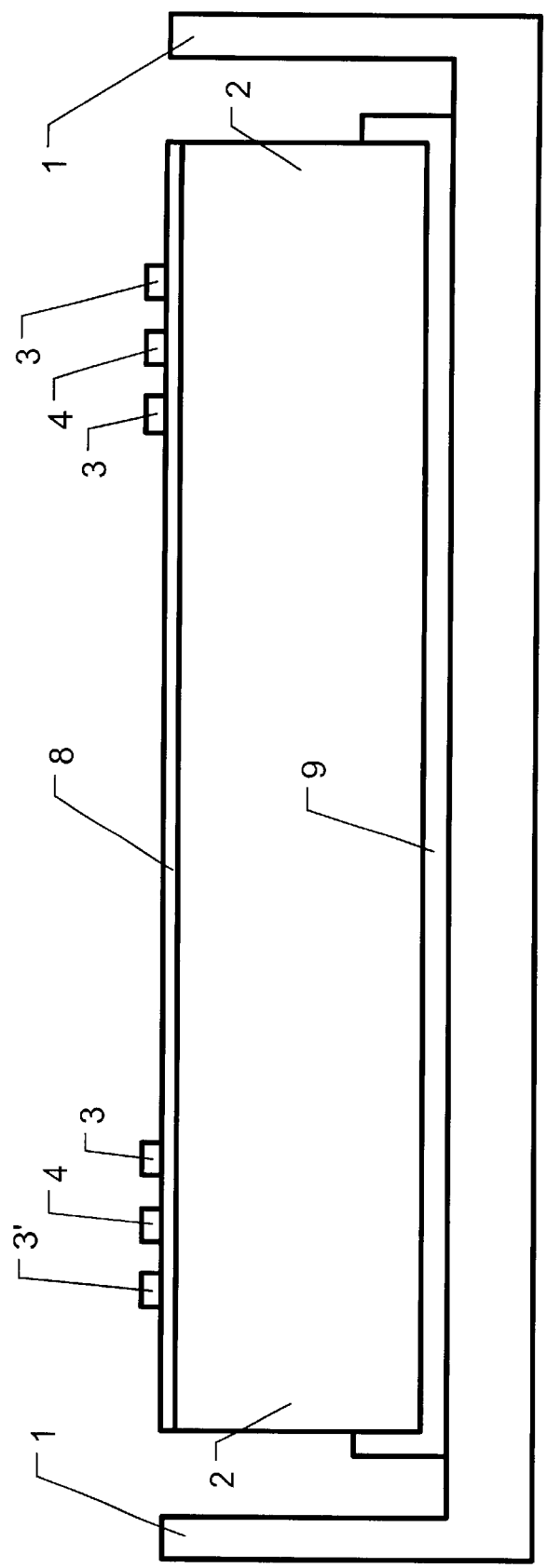
FIG. 3 shows a side view of an optical modulator chip on a grounded base illustrating an exemplary embodiment of the present invention.

FIG. 3 illustrates an exemplary embodiment of the invention, as incorporated into an optical modulation device like shown in FIG. 1, viewed in the direction A—A of FIG. 1. As shown in FIG. 3, the electrodes 3/4/3' are on a buffer layer 8 on top of the optical modulator chip 2 and terminate on the top surface edge of the optical modulator chip 2. In the alternative, the buffer layer 8 may be omitted from the device. The grounded base 1 underlies the optical modulator chip 2. The grounded base 1 can be a flat substrate or a mount with a well, as shown in FIG. 3. In addition, FIG. 3 also illustrates a resistive layer 9 positioned between the optical modulator chip 2 and the grounded base 1. Preferably, the resistive layer 9 completely covers the entire back surface of the optical modulation chip 2. However, the resistive layer 9 can partially cover the back surface of the optical modulation chip 2. Furthermore, the resistive layer 9 can extend up the sides of the optical modulator chip 2 as shown in FIG. 3.

In the case of a Z-cut Lithium Niobate optical modulator chip, the resistance of the resistive layer 9 prevents the optical modulator chip from coupling into parallel plate modes or other extraneous modes with the grounded base, while charge leakage through the resistive layer 9 allows for enough charge bleed-off from the optical modulator chip to the grounded base to prevent bias instability. For the case of X-cut Lithium Niobate optical modulator chip, the resistive layer 9 serves to prevent the optical modulator chip from coupling into parallel plate modes or other extraneous modes. Generally, the resistive layer 9 should be sufficiently insulative to prevent coupling of the optical modulator chip into parallel plate modes but yet, particularly for the case of a Z-cut Lithium Niobate optical modulator chip, be sufficiently conductive to allow for a bleed off of excess charges from the optical modulator chip. A resistive layer 9 comprising a material such as carbon adequately accomplishes these purposes.

The resistive layer may comprise carbon that can either be sprayed or painted on to the back surface of the optical modulator, for example, a carbon paint. An example of a carbon paint suitable for this purpose is SPI Carbon Paint™ of Structure Probe, Inc. West Chester Pa. 19381. Other resistive materials such as metal based ceramics, conductive epoxies/plastics or other large finite resistance materials can be used.

Figure 4:
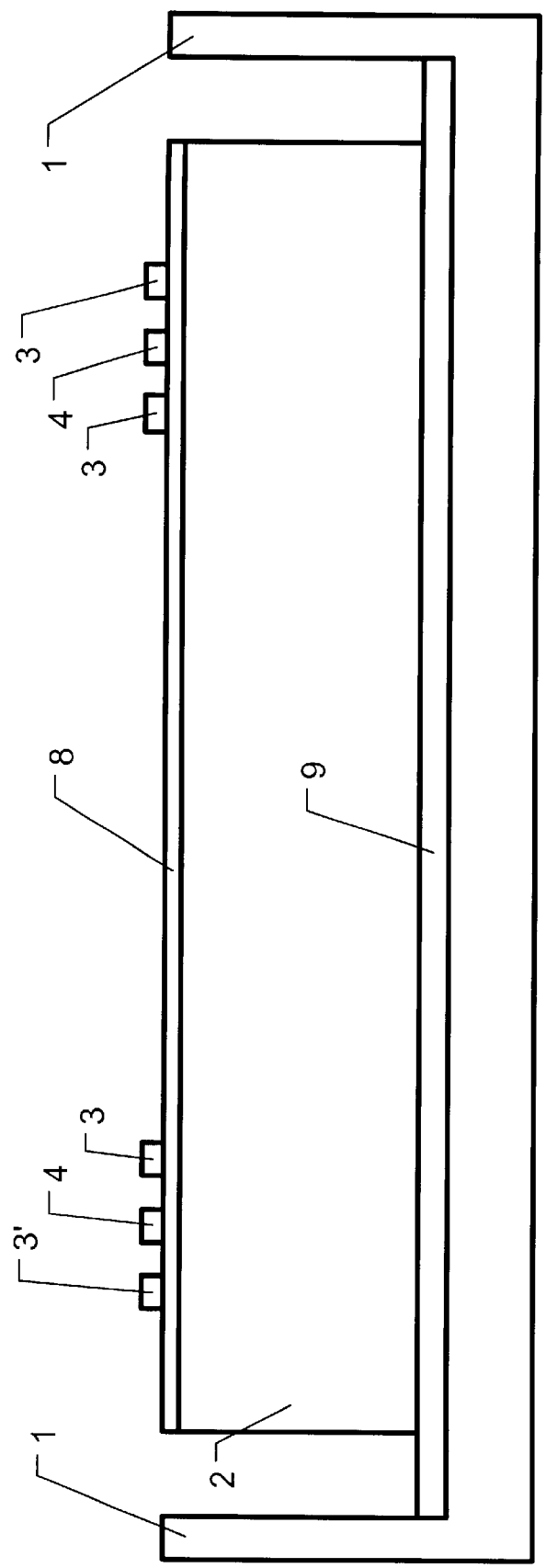
FIG. 4 shows a side view of an optical modulator chip on a grounded base illustrating another exemplary embodiment of the present invention.

In the alternative, bias stability and the prevention of extraneous mode coupling can be achieved by the resistive layer 9 being applied to an entire top surface of the grounded base and the optical modulator chip being placed on the resistive layer 9. As shown in FIG. 4, the electrodes 3/4/3' on a buffer layer 8 terminate on the top surface edge of the optical modulator chip 2. The grounded base 1 underlies the optical modulator chip 2. A resistive layer 9 is positioned on the entire bottom surface of the grounded base 1 that underlies the optical modulator chip 2. In addition, it is within the scope of the present invention, that side surfaces of the optical modulator chip can have a resistive layer on the side surfaces of the optical modulator chip.

Figure 5:
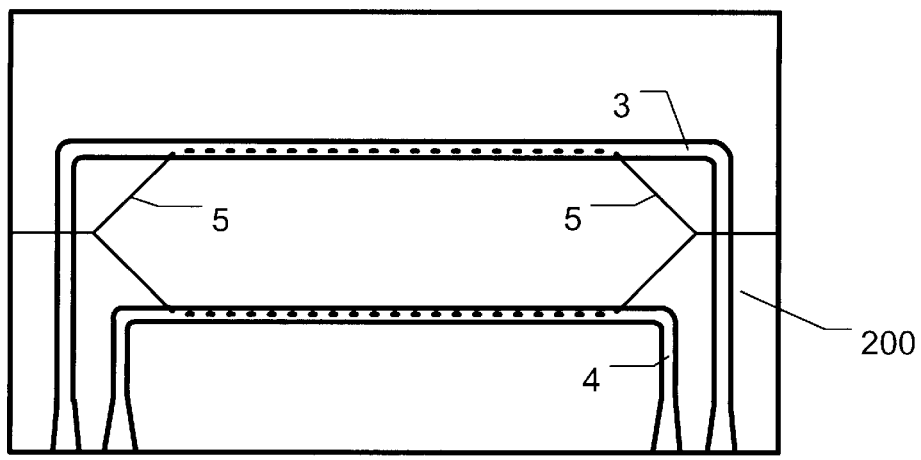
FIG. 5 shows an optical modulator device with a single ground electrode and a single signal electrode that can be used with the present invention.
Figure 6:
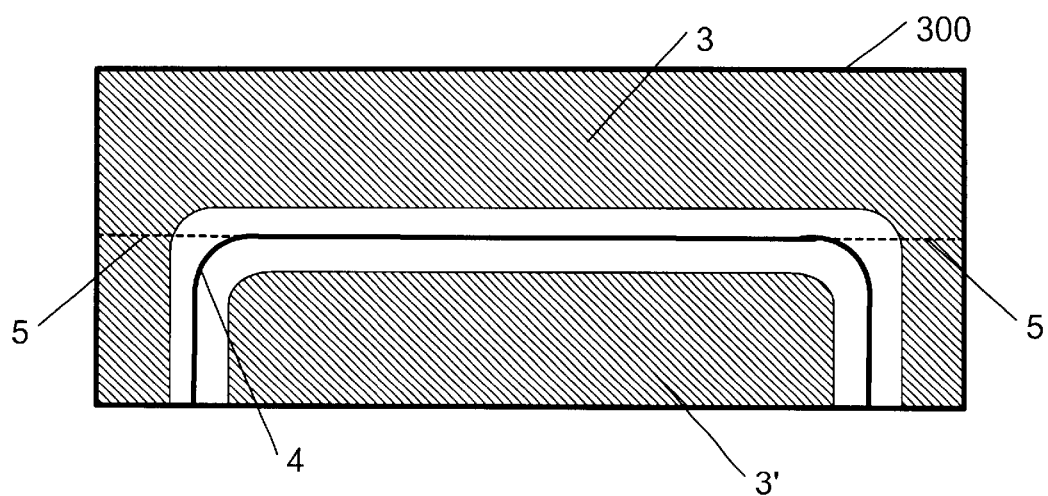
FIG. 6 shows an optical modulator device with planar ground electrodes that can be used with the present invention.

In addition, the present invention can be used in other types of modulator devices. For example, as shown in FIG. 5, is a Mach-Zehnder interferometer 200 with waveguide 5 and a signal electrode 4 and a ground electrode 3. However, the present invention can be used in other single ground electrode modulators. FIG. 6 illustrates how the present invention can be used in a modulator device 300 having planar ground electrodes. The modulator device in FIG. 6 has a first planar ground electrode 3, a second planar ground electrode 3', a waveguide 5 and signal electrode 4. It is also within the scope of the present invention that the exemplary embodiments can be used to modify optical modulators having more than two ground electrodes and/or more than one signal electrode.

It will be apparent to those skilled in the art that various modifications and variations can be made in the optical modulator of the present invention without departing from the spirit or scope of the invention. Thus, it is intended that the present invention covers the modifications and variations of this invention provided they come within the scope of the appended claims and their equivalents.

What is claimed is:

1. An optical device, comprising:
   an optical modulator chip having a top surface, a back surface and side surfaces;
   at least one ground electrode and a signal electrode located over the top surface of the optical modulator chip; and
   a resistive layer applied on the back surface of the optical modulator chip, wherein the resistive layer has resistance such that electrical charge is dissipated on the back surface of the optical modulator chip and to prevent the optical modulator chip from coupling into parallel plate modes.

2. The optical device of claim 1, wherein the resistive layer comprises carbon.

3. The optical device of claim 1, wherein the resistive layer is on at least one side surface of the optical modulator chip.

4. The optical device of claim 1, wherein the resistive layer comprises a carbon paint.

5. An optical device, comprising:
   a grounded base having top surface;
   an optical modular chip having a top surface, a back surface and side surfaces, wherein the optical modulator chip is positioned over the grounded base with the back surface of the optical modulator chip facing the top surface of the grounded base; and
   a resistive layer positioned between the grounded base and the optical modulator chip, wherein the resistive layer has resistance such that electrical charge is dissipate on the back surface of the optical modulator chip and to prevent the optical modulator chip from coupling into parallel plate modes.

6. The optical device of claim 5, wherein the resistive layer completely covers the back surface of the optical modulator chip.

7. The optical device of claim 5, wherein the resistive layer completely covers the top surface of the grounded base facing the optical modulator chip.

8. The optical device of claim 7, wherein the top surface of the grounded base is the bottom of a well in the grounded base for mounting the optical modulator chip.

9. The optical device of claim 5, wherein the resistive layer comprises carbon.

10. The optical device of claim 5, wherein the resistive layer is carbon paint.

11. The optical device of claim 5, wherein the resistive layer is on at least one side surface of the optical modulator chip.

12. An optical device, comprising:
    a grounded base having a top surface;
    an optical modulator chip having a top surface, a back surface and side surfaces, wherein the optical modulator chip is positioned over the grounded base with the back surface of the optical modulator chip facing the top surface of the grounded base; and
    at least one ground electrode and a signal electrode located over the top surface of the optical modulator chip, wherein a resistive layer is positioned between the top surface of the grounded base and the back surface of the optical modulator chip, wherein the resistive layer has resistance such that electrical charge is dissipated on the back surface of the optical modulator chip and to prevent the optical modulator chip from coupling into parallel plate modes.

13. The optical device of claim 12, wherein the resistive layer completely covers the back surface of the optical modulator chip.

14. The optical device of claim 12, wherein the resistive layer completely covers the top surface of the grounded base.

15. The optical device of claim 14, wherein the top surface of the grounded base is the bottom of a well in the grounded base for mounting the optical modulator chip.

16. The optical device of claim 12, wherein the resistive layer is comprises carbon.

17. The optical device of claim 12, wherein the resistive layer is carbon paint.

18. The optical device of claim 12, wherein the resistive layer is on at least one side surface of the optical modulator chip.

19. The optical device of claim 12, wherein the resistive layer partially covers the back surface of the optical modulator chip.

* * * * *